United States Patent
Pinior

[11] 3,728,548
[45] Apr. 17, 1973

[54] DEVICE FOR MEASURING THE INTENSITY OF A SCANNING LIGHT BEAM BY MEANS OF A LIGHT CONDUCTING ROD

[75] Inventor: Gernot Pinior, 8034 Germering, Germany

[73] Assignee: Erwin Sick Optik-Elektronik, Waldkirch, Germany

[22] Filed: Mar. 23, 1972

[21] Appl. No.: 237,363

[30] Foreign Application Priority Data

Apr. 1, 1971 Germany....................P 21 15 979.5
Oct. 11, 1971 Germany....................P 21 50 634.3

[52] U.S. Cl............250/217 R, 250/227, 250/237 R, 350/96 R
[51] Int. Cl............G02b 5/14, H01j 5/16, H01j 3/14
[58] Field of Search......................250/217, 227, 237; 350/96 R

[56] References Cited

UNITED STATES PATENTS

| | | | |
|---|---|---|---|
| 2,719,235 | 9/1955 | Emerson | 250/237 R |
| 2,744,200 | 5/1956 | Taylor | 250/237 R |
| 3,317,738 | 5/1967 | Piepenbrink et al. | 250/227 |

*Primary Examiner*—James W. Lawrence
*Assistant Examiner*—T. N. Grigsby
*Attorney*—George F. Dvorak et al.

[57] ABSTRACT

A device for measuring the intensity of a scanning light beam moving in a preferably plane face, having a transparent light-conducting rod having a front and back end and being mounted in said plane face substantially parallel to the direction of scanning of the light, the rod conducting at least one portion of the light which impinges thereupon and enters therein toward the front end by reflecting on the walls of said rod; a photoelectric receiver mounted adjacent the front end of the rod for transforming the light current reaching the front end of the rod into an electrical signal; a light-reflecting surface extending along the light-conducting rod in spaced relation on the side of the rod opposite the area of light impingement on the rod; a series of separate screens extending along the axis of the rod and interposed between the light reflecting surface and the rod, each screen being adjustable transversely of the longitudinal axis of the rod such that each screen influences in a different manner that portion of the light emerging laterally from the walls of the rod and reflected back into the rod by the light reflecting surface according to the adjustment of the respective screen as to the portion of the light reflecting surface exposed to the rod and not blocked by the screen according to the adjustment of the screen.

14 Claims, 3 Drawing Figures

PATENTED APR 17 1973  3,728,548

DEVICE FOR MEASURING THE INTENSITY OF A SCANNING LIGHT BEAM BY MEANS OF A LIGHT CONDUCTING ROD

BACKGROUND OF THE INVENTION

This invention relates to a device for measuring the intensity of a scanning light beam moving in a preferably plane face by means of a transparent light-conducting rod which is mounted in said face substantially parallel to the direction of scanning and which conducts at least one portion of the light which impinges thereupon and enters therein toward the front ends by reflecting on the walls of said rod, on at least one of which is mounted a photoreceiver for transforming the light current reaching the front end into an electrical signal.

Such devices are used, for example, in scanning devices in which a sharply bundled laser beam scans a web to be examined for flaws line-by-line. The arrangement can be such that the laser beam, for example, impinges on the web from the side while the light-conducting rod is arranged on the opposite side of the web. The construction, however, can also be such that both the laser beam as well as the light-conducting rod both lie on the same side of the web, the light-conducting rod receiving the light reflected from the web.

In both bases, the light which is either reflected by or passes through the web, proceeds to the surface of the light-conducting rod, enters the rod at this point, and is propagated in axial direction due to the total reflections on the walls of the light-conducting rod. It is finally received by the one or more photoreceivers arranged at the front end and transformed into an electrical signal which is a measure of the intensity of the light current impinging on the surface of the light-conducting rod.

A problem previously encountered in devices of the class hereinbefore cited which function with light-conducting rods consists in the fact that light, which falls on different locations of the light-conducting rod, must cover different distances before it reaches the photo receiver and that, in addition, irregularities in the material of the light-conducting rod along with surface distortions, such as scratches and the like, affect nonuniformily the incident light beam which impinges on the different locations along the length of the light-conducting rod. In this way, the electrical signal delivered by the photoreceiver is not only influenced by the intensity of the light current impinging on the light-conducting rod, but also by the cited faults in the light-conducting rod.

SUMMARY OF THE INVENTION

Accordingly, one feature of the present invention is to provide a device in which the same output signal is always obtained on the photoreceiver in the event that equally strong light beams impinge on different places along the length of the rod at different times, irrespective of the presence of any imperfections, irregularities, or surface distortions in the light-conducting rod.

This is accomplished in the present invention in that a number of discrete screens, which can be adjusted transversely to the axis of the rod, are disposed along the rod such that each screen influences in a different manner that portion of the light reflected back into the rod which initially emerged laterally from the rod at that location, according to the adjustment of the respective screen. Hence, the respective screens of a particular light-conducting rod can be individually adjusted such that the imperfections of the particular light-conducting rod at the individual screen positions are fully compensated for by reflecting back into the light-conducting rod either more or less of the light which emerged from the rod at that respective screen position. The consequence is that the output signal of the photoreceiver, which is preferably positioned at the front end of the light-conducting rod, is constant in the case of a light beam which scans the rod at a constant intensity along the length thereof.

According to a preferred embodiment of the invention, the light-conducting rod has a mat surface along the area of impingement of the scanning beam. This effects dispersion of the impinging light beam in all directions so that an extensive portion of the impinging light acquires an axial propagation component within the light-conducting rod so that the required total reflection is achieved and a marked share of the light reaches the photoreceiver.

It is especially preferred that a transparent cover plate be disposed a short distance from the area of impingement, the underside of said plate having a mat surface at least in the region where the scanning beam enters said rod. Hence, in such an embodiment, two mattings are arranged in spaced close opposite relation. This results in that a still larger portion of the impinging light is defracted at the critical angle of total reflection and thus reaches the photoreceiver, and also results in that the background noise level of the photoreceiver is advantageously reduced, since distortions in the mat surfaces are mutually compensated for.

The differential light reflection outside the light-conducting rod at different locations on the length thereof is preferably achieved in that a light-reflecting surface extending along the light-conducting rod is provided in spaced relation on the side of said rod opposite the area of impingement, which surface is more or less covered by adjustable screens according to the adjustment thereof. Thus, only the amount of emerging light is reflected back into the light-conducting rod as is selectively made possible by the adjustment of the screens. However, the arrangement could be designed such that the screens have light reflecting properties and are disposed above an absorbent background.

The number of screens arranged along the light-conducting rod and extending over the entire scanning region can be selected to achieve the desired degree of compensation. It is expedient if the dimension of each screen in the direction of the rod axis is approximately the dimension of the radius of the rod.

The yield of light can be substantially increased, especially when working with light reflected from a web, if a cylindrical lens of the same length as the light-conducting rod is disposed parallel to and spaced from the rod, which lens projects the line of light impingement of a scanning beam on the surface to be monitored onto the mat area of the cover plate.

A simple possibility of taking into account the different path lengths covered by the individual light beams in the light-conducting rod consists in spacing the light-conducting rod a greater distance from the cover plate at the rod end nearest the photoreceiver than at the rod end furthest from the photoreceiver such that the greater degree of absorption of the light beams which traverse a longer path in the light-conducting rod to reach the photoreceiver is compensated for. The light-conducting rod can be slightly tipped about its transverse axis extending perpendicular to the rod axis and to the light beam to achieve this effect. Based on this construction, the mat areas of the light-conducting rod and of the cover plate are somewhat closer at the end of the light-conducting rod furthest from the photoreceiver so that more light enters the light-conducting rod at this furthest end, thereby compensating for the absorption of part of these light beams on their relatively long way to the photoreceiver. Accordingly, it is apparent that the amount of light entering the light-conducting rod continuously decreases as the distance from the photoreceiver decreases due to the increasing distance between the two mat areas such that the amount of light corresponds to the decreasing absorption based on the continuously decreasing distance from the photoreceiver.

Other objects and advantages of this invention will be apparent during the course of the following description.

BRIEF DESCRIPTION OF THE DRAWINGS

In the accompanying drawings forming a part of this specification and in which like reference characters are employed to designate like parts throughout the same.

DESCRIPTION OF THE PREFERRED EMBODIMENT

Figure 1:
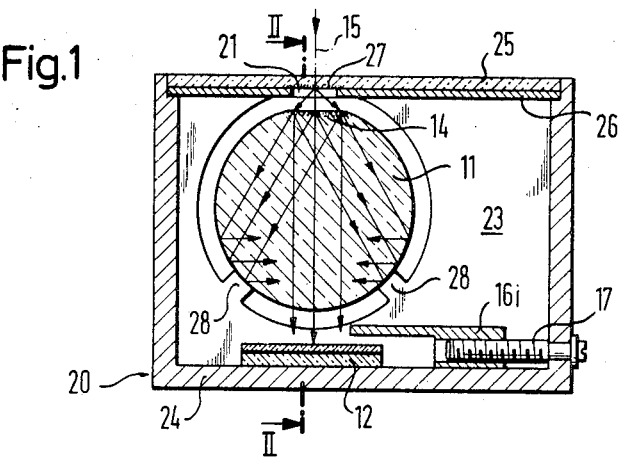
FIG. 1 is a front view in cross-section taken along line I—I of FIG. 2 illustrating the preferred embodiment of a device in accordance with the invention.
Figure 2:
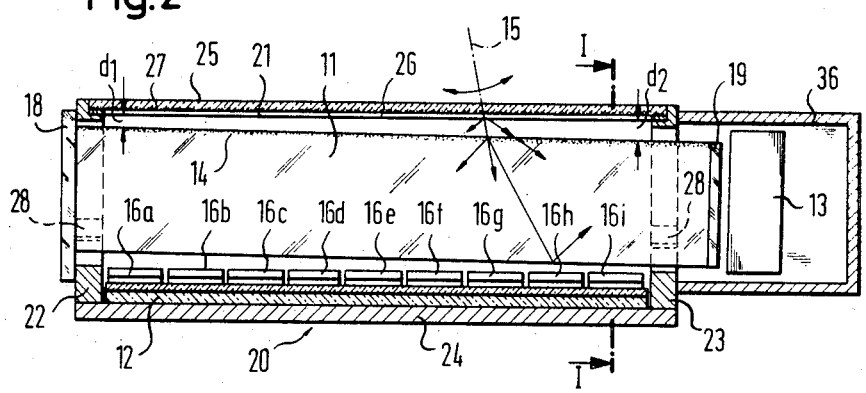
FIG. 2 is a cross-sectional view taken along line II—II of FIG. 1.

In the drawings, wherein for the purpose of illustration is shown a preferred embodiment of this invention, and first particularly referring to FIGS. 1 and 2, there is shown a light-conducting rod 11 of circular cross-section having flat end surfaces, the rod being mounted in and extending between end walls 22, 23 of a housing 20, the ends of the rod projecting out of the housing 20 through the end walls 22, 23. The rod is secured to the housing end walls at two locations 28 which are as small as possible so as to avoid hindering the total reflection of the rod as much as possible.

The rectilinear light-conducting rod 11 has a mat surface longitudinally extending along a flat area 14 formed in the top surface of the rod, the mat surface extending parallel to a generating area. This mat surface 14 can be produced by any of presently known methods, such as by grinding or etching.

The top side of the housing 20 is closed by a glass cover plate 25, on the underside of which a screen 26 is mounted which has a longitudinal slot 21 permitting access of a beam of light 15 to mat surface 14 disposed beneath the slot. This beam of light 15 is a laser beam which scans the light-conducting rod 11 along the mat surface 14.

The underside surface of the glass cover plate 25 opposite the mat surface 14 is provided with a mat surface 27 extending longitudinally along the bottom surface thereof. The spacing between the two mat surfaces 14 and 27 is so small that the major portion of the light dispersed on the mat surface 27 also falls on the mat surface 14.

An elongated plane mirror 12 which is arranged in spaced relation with the bottom of the light-conducting rod 11 extends longitudinally along the base 24 of the housing 20 parallel to the axis of the rod 11.

A longitudinally extending series of spaced adjacent discrete screens indicated by reference numerals 16a though 16i are interposed between the light-conducting rod 11 and the mirror 12. Each of these screens can be reciprocally adjusted by means of a screw spindle arrangement 17 such that they may be moved into position between the light-conducting rod 11 and the mirror 12, or moved out of such position thus covering the mirror 12 to a greater or lesser degree relative to the rod 11.

A photoelectric receiver 13 is mounted in a housing 36 adjacent the right front end of the light-conducting rod 11 as shown in FIG. 2. A filter 19 is interposed between the rod 11 and the photoelectric receiver 13 and serves to permit the passage of laser light to the photoelectric receiver 13 and serves to permit the passage of laser light to the photoreceiver of a specified wave length thereby substantially excluding any interference light. A plane mirror 18 is secured on the opposite left back end of the rod 11 as shown in FIG. 2, which mirror amplifies the light current reaching the photoelectric receiver 13.

Moreover, a sharply bundled laser beam 15 is illustrated in the Figures which periodically scans the mat surface 14 in the sense shown by the double arrow in FIG. 2. The dispersion of the light in the rod 11 is generally indicated in FIGS. 1 and 2 by arrows.

The mode of operation of the device generally follows:

The laser light beam 15 which impinges on the surface 27 on the underside of the cover plate 25 is scattered in all directions as indicated by the arrows in FIGS. 1 and 2. Thus, not only substantially vertical light falls on the mat surface 14 of the light-conducting rod 11, but also light directed in numerous other angles. This renewed dispersion of the light on the mat surface 14 has as a result that a large portion of the incident light enters the light-conducting rod 11 under such angles that a total reflection of the light on the walls of the rod is apparent, thus resulting in that a larger portion of the incident light impinges on the photoelectric receiver 13 mounted at the front end of the rod. A large portion of the light also proceeds directly to the photoelectric receiver 13 due to the scattering effect. This is indicated by the arrows in FIG. 2. The mat surface 27 also has the task of creating many light beams having different directions from one light beam 15 which proceeds in essentially one direction only.

As soon as the light is scattered, it enters the light-conducting rod 11 as soon as possible in order that not too much light is lost in by-passing the light-conducting rod. Hence, the light-conducting rod 11 is positioned as close to the mat surface 27 as possible. For practical purposes, it is desirable that the distance of the mat surfaces 14 and 27 be approximately the width of the light impingement region.

In accordance with the arrows in FIG. 1, one respective portion of the light, which has entered the light-conducting rod 11, leaves the rod again and enters the surrounding region within the housing 20. In the area of the mirror 12, however, the light leaving the rod 11 is reflected by the mirror and reenters the rod. Depending on the angles of entrance and emergence, at least a part of this reentering light proceeds to the photoelectric receiver 13. Depending on the depth to which the individual screens 16a to 16i have been interposed between the rod 11 and the mirror 12, a greater or lesser share of the light leaving the light-conducting rod 11 will be reflected by the mirror and returned to the rod.

Should there be a loss of light at any location along the light-conducting rod 11 due to an irregularity or a surface flaw in the rod, this can be compensated for by selectively adjusting the particular screen 16 adjacent the flawed portion of the rod.

The light definition of the subdivision of the individual screens 16a to 16i can be made depending on the material used for the light-conducting rod 11. If the rod irregularities vary greatly within a short distance, then more individual screens must be provided than if the irregularities vary only over a relatively long section of the rod.

As best seen in FIG. 2, the light-conducting rod 11 is inclined slightly such that the distance $d1$ between the left portion of the cover plate 25 and the left back end of the rod 11 is somewhat smaller than the distance $d2$ between the right portion of the cover plate 25 and the right front end of the rod 11. The different degrees of absorption of the light which impinges on the rod 11 at varying distances from the photoelectric receiver 13 are thereby compensated for by the difference in distances $d1$ and $d2$.

Figure 3:
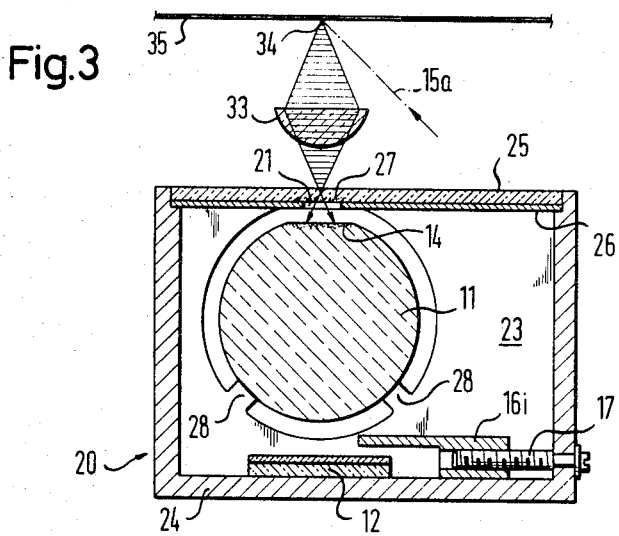
FIG. 3 is a schematical cross-sectional view corresponding to FIG. 1 of a device in accordance with the invention having an additional cylindrical lens.

FIG. 3 shows in a schematic illustration a development of the invention in which a transmitted beam 15a impinges on a surface 35 to be checked, such as for example a moving web of material, and scans the surface 35 along a line 34 parallel to the disposition of the rod 11. The light of impingement 34 is projected onto the mat surface 27 of the light-conducting rod 11 by means of a cylindrical lens 33. since the lens 33 projects the light present on the line of impingement 34 not as a dot, but rather as a more or less oval figure extending in the longitudinal direction of the rod 11, the error compensation caused by the device in accordance with the invention is enhanced even more substantially.

It is understood that the form of this invention herewith shown and described is to be taken as a preferred example of the same, and that various changes in shape, size and arrangement of parts may be resorted to without departing from the spirit of the invention or the scope of the subjoined claims.

Having thus described the invention, I claim:

1. A device for measuring the intensity of a scanning light beam moving in a preferably plane face, comprising a transparent light-conducting rod having a front and back end and being mounted in said plane face substantially parallel to the direction of scanning of the light, the rod conducting at least one portion of the light which impinges thereupon and enters therein toward the front end by reflecting on the walls of said rod; a photoelectric receiver mounted adjacent the front end of the rod for transforming the light current reaching the front end of the rod into an electrical signal; a light-reflecting surface extending along the light-conducting rod in spaced relation on the side of the rod opposite the area of light impingement on the rod; a series of separate screens extending along the axis of the rod and interposed between the light reflecting surface and the rod, each screen being adjustable transversely of the longitudinal axis of the rod such that each screen influences in a different manner that portion of the light emerging laterally from the walls of the rod and reflected back into the rod by the light reflecting surface according to the adjustment of the respective screen as to the portion of the light reflecting surface exposed to the rod and not blocked by the screen according to the adjustment of the screen.

2. A device according to claim 1, wherein the light-conducting rod has a longitudinally extending flat surface formed thereon, and a mat surface formed along the flat surface in the region of the impingement of the scanning beam.

3. A device according to claim 2, wherein a transparent cover plate is disposed above the rod a short distance from the area of light impingement on the rod, the underside of the cover plate having a mat surface formed therein at least in the region where the scanning beam passes through the cover plate and enters the rod.

4. A device according to claim 3, wherein the distance between each of the mat surfaces is substantially less than the diameter of the rod.

5. A device according to claim 4, wherein the distance between each of the mat surfaces is equal to the width of the mat surfaces.

6. A device according to claim 3 further comprising a screen covering the underside of the transparent cover plate except for the mat surface formed thereon.

7. A device according to claim 1 further comprising a screw spindle arrangement for each screen which is accessible from the outside of the housing for adjusting each screen.

8. A device according to claim 1 further comprising a mirror mounted adjacent the back end of the light-conducting rod for reflecting light emerging from the back end of the rod towards the front end of the rod.

9. A device according to claim 1, wherein the width of the light-reflecting surface lies between the radius and the diameter of the rod.

10. A device according to claim 1 wherein the beam of light is a laser beam.

11. A device according to claim 1 wherein the light-conducting rod is supportively mounted between the end walls of the housing on two narrow support members which are spaced at an angle of 90° relative to the longitudinal rod axis and which are symmetrical about a plane taken vertically along the longitudinal axis.

12. A device according to claim 1 further comprising a cylindrical lens of the same longitudinal length as the light-conducting rod, the lens being disposed parallel to and spaced from the rod, the lens projecting the line of impingement of a scanning beam of light reflected from a surface to be monitored onto the rod.

13. A device according to claim 2, wherein the light-conducting rod is spaced farther away from the cover plate at the end associated with the photoelectric receiver than at the opposite end such that the greater degree of absorption of the light beams which traverse a longer path in the light-conducting rod is compensated for.

14. A device according to claim 13, wherein the light-conducting rod can be slightly tipped about a transverse axis extending perpendicular to the rod axis and the impinging light beam so as to achieve more complete compensation for the different traversal times required for light to travel in the rod.

* * * * *